United States Patent [19]
Hoganson

[11] 3,762,493
[45] Oct. 2, 1973

[54] VARIABLE RATIO STEERING CONTROL

[76] Inventor: Eugene M. Hoganson, 16517 Canterburg Dr., Minnetonka, Minn. 53343

[22] Filed: Aug. 16, 1971

[21] Appl. No.: 171,980

[52] U.S. Cl............ 180/79.2 B, 74/388 PS, 91/381
[51] Int. Cl................................................ B62d 5/06
[58] Field of Search ............... 180/79.2 R, 79.2 B; 74/388 PS; 91/379, 381

[56] References Cited
UNITED STATES PATENTS

| | | | |
|---|---|---|---|
| 2,762,585 | 9/1956 | Eaton et al. | 91/381 X |
| 3,370,422 | 2/1968 | Carlson et al. | 180/79.2 B X |
| 3,672,460 | 6/1972 | Takata | 180/79.2 B |
| 2,874,793 | 2/1959 | Wagner | 180/79.2 R |
| 3,312,302 | 4/1967 | Naddell | 180/79.2 B |
| 2,973,658 | 3/1961 | Bishop | 180/79.2 R X |

Primary Examiner—Benjamin Hersh
Assistant Examiner—Leslie J. Paperner
Attorney—James R. Cwayna

[57] ABSTRACT

A steering control for heavy vehicles, either fixed frame or articulated, such as earth moving equipment and the like which permits a controlled decreasing steering ratio from a high steering ratio to a low steering ratio from lock to lock of the steering wheel such that a steering ratio suitable to the particular useage of the vehicle at the time is provided. The variable relationship of the unit is obtained by providing a hydraulic steering arrangement for the direct movement of the steered wheels and providing a follow-up or read-out to determine the extent of the rotation of the wheels and linking this read-out back through the direct control through a variable movement device such as elliptical gears such that the read-out device will shift the main or direct control device in a desired non-linear relation.

5 Claims, 7 Drawing Figures

PATENTED OCT 2 1973 3,762,493

INVENTOR.
EUGENE M. HOGANSON
BY
James R. Cwayna
ATTORNEY

INVENTOR.
EUGENE M. HOGANSON
BY
James R. Cwayna
ATTORNEY

VARIABLE RATIO STEERING CONTROL

When operating certain equipment it is necessary that the steering mechanism take into consideration two distinct conditions. The first of these may be the actual operating function wherein the unit must be highly maneuverable and operate at a low speed and the second function may be when the unit is in transport and capable of relatively higher speeds such as when the same is being driven down a highway. A steering mechanism that is suitable for one of these functions may be unsuitable for the other. As an example, when a log skidder is used in the forest, a high degree of manuverability is desired but when the driver is faced with an open road situation this same type of steering would require making constant corrections in order to hold the vehicle in a straight line and against the crown in the road.

For purposes of definition, in the disclosure hereof, a "high steering ratio" will result in slow steering, such as would be desirable for open or over the road travel and a "low steering ratio" will result in fast steering, such as would be desirable for situations demanding a high degree of maneuverability.

Applicant provides herein a steering mechanism that is provided with a means to alter this steering ratio from a "high steering ratio" to a "low steering ratio" such that the various situations of operation will be met by a preferred steering control.

Applicant has provided herein a steering concept that provides a system having means for controlling this steering ratio wherein a certain segment of the rotation of the steering wheel from a straight line relation will best accomodate the open road conditions and thereafter the ratio will decrease over the remaining wheel rotation to a condition of high maneuverability.

In order to accomplish this variable ratio steering control, applicant provides a unique input-followup relation which provides readjustment of the recovery of the direct control valve of the power steering system at a variable rate over the full steering cycle. This variable rate being symmetric over each side of straight ahead.

It is therefore an object of applicant's invention to provide a variable steering ratio control device for heavy vehicles and the like which permits a change in steering ratio from a straight ahead position to each lock of the steering wheel.

It is a further object of applicant's invention to provide a steering control for articulated vehicles and the like which will permit an ease of control for the operator under all the conditions of operation of the vehicle.

It is still a further object of applicant's invention to provide a variable steering ratio control which will provide a high steering ratio at a straight ahead position of the steering wheel and a relatively low steering ratio at the ends of the steering wheel rotation on either side of straight ahead.

These and other objects and advantages of the applicant's invention will become more obvious and more fully appear from the accompanying disclosure made in connection with the accompanying drawings and in which like numerals represent the same or similar parts throughout the several views and in which.

Figure 1:
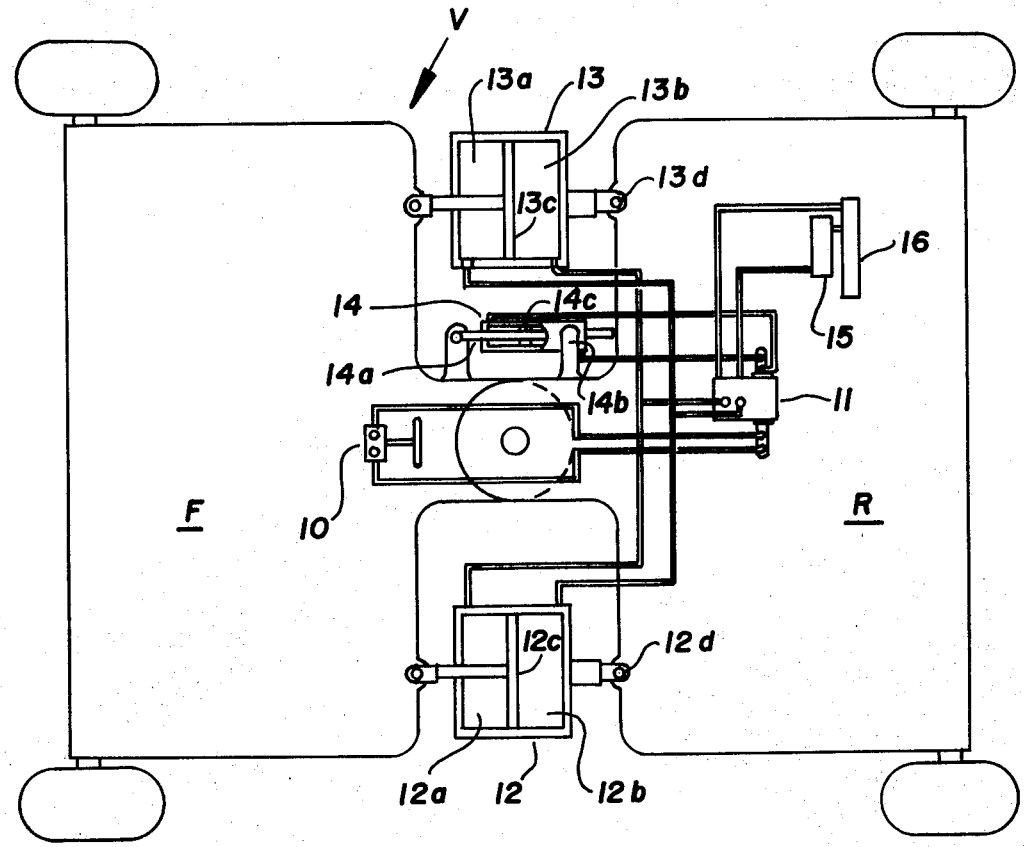
FIG. 1 is a schematic illustration of a hydraulic steering device embodying the concepts of applicant's invention on an articulated vehicle.

In accordance with the accompanying drawings, an articulated vehicle V, consisting of a rotatably connected frontal portion F and a rear portion R is illustrated in FIG. 1, with a steering device embodying the concepts of applicant's invetion for steering control thereof. In this particular installation, the elements of applicant's structure are designated as follows: Steering wheel hand pump 10, control valve 11, actuating cylinders 12, 13, followup cylinder 14, pump 15 and reservoir 16.

The operation of this installation is as follows: Rotation of the steering wheel 10, for example to complete a left hand turn will, through the steering wheel hand pump direct fluid to the control valve to move the internal spool therein such that hydraulic fluid supplied by pump 15 to the control valve 11 would be directed to cylinder sections 12a and 13b while allowing fluid to exhaust from cylinder sections 12b and 13a. As the pistons 12c, 13c are connected to the frontal portion F of the unit V and the cylinders 12d, 13d are connected to the rear portions R of the vehicle V, the respective sections will be rotated with respect to one another. The followup cylinder 14 is respectively connected at its ends 14a, 14b to the front and rear portions of the vehicle V and the piston 14c thereof will pump fluid back to the control valve 11 where it will normally move the valve spool contained in the valve body to a position of no additional flow or no demand for flow. In applicant's device this followup cylinder 14 acts directly on the spool valve itself through a variable connection therewith such that the objects of varying the steering ratio may be obtained.

Figure 2:
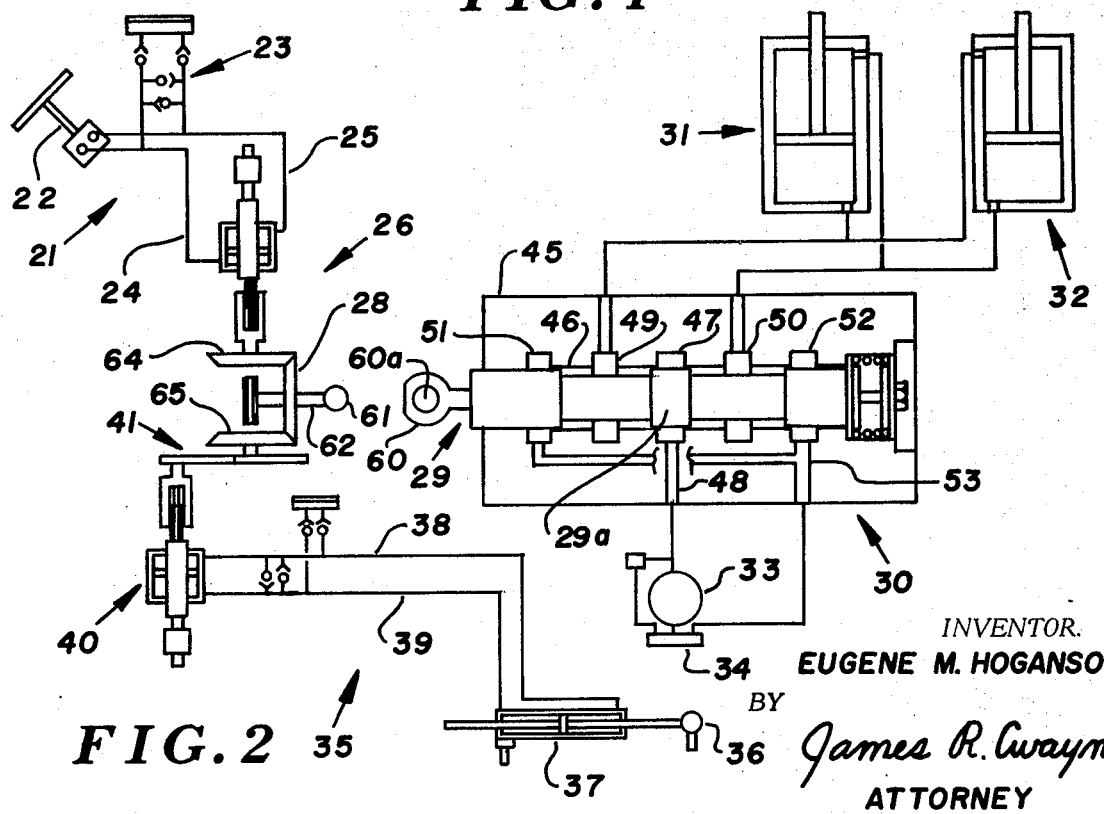
FIG. 2 is a more detailed schematic illustration of the hydraulic circuit of FIG. 1.
Figure 3:
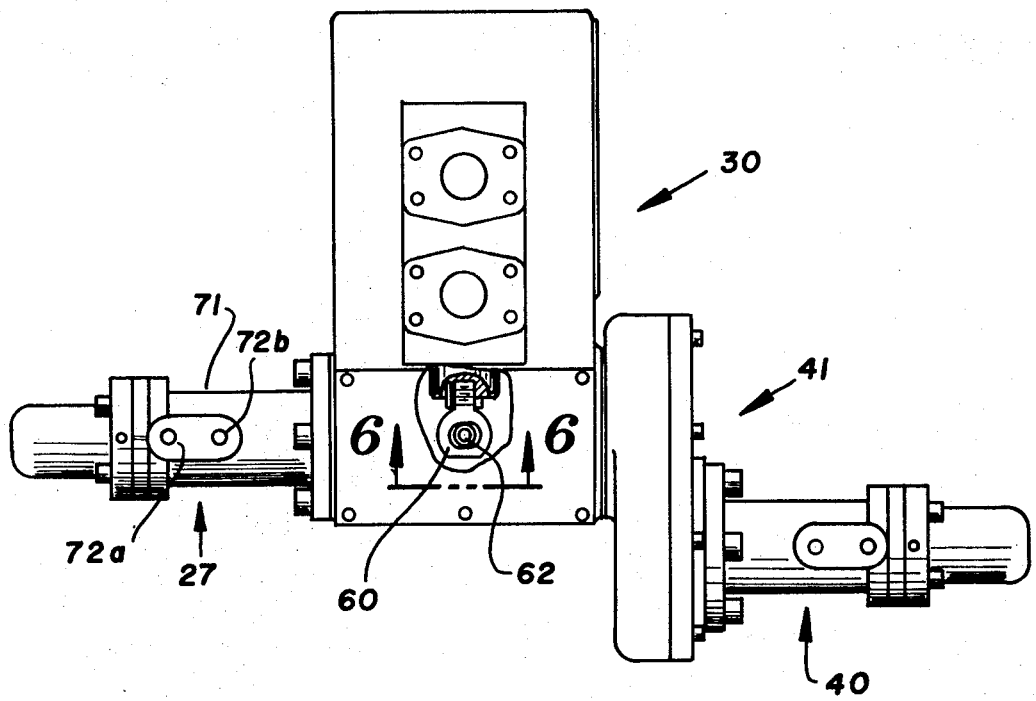
FIG. 3 is a plan view of the control portion of applicant's invention with sections thereof broken out for sake of clarity.
Figure 4:
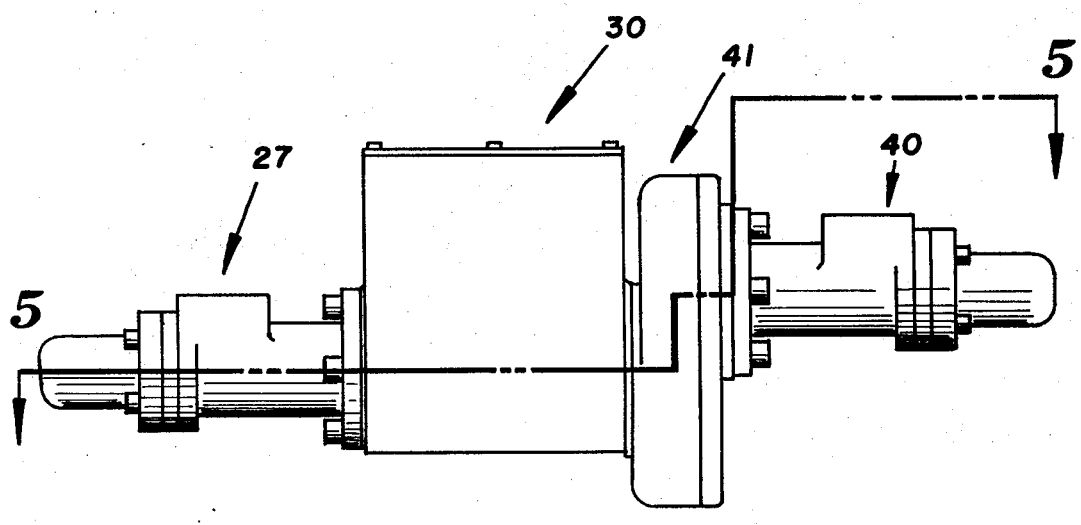
FIG. 4 is a side elevation of the control portion of FIG. 3.

Applicant's device is schematically illustrated in FIG. 2 and in this form the steering wheel and hand pump circuitry is designated 21 and includes the wheel 22, reservoir and check valve arrangement 23 with the flow lines therefrom designated 24, 25, which flow lines are connected to an input end 27 (FIG. 3,4,5) of the control valve 26 which valve 26 generally includes a differentially geared spool engaging portion 28, valve spool 29 and valve body 30. The valve body 30 and particularly the outlets therefrom are connected to actuating cylinders 31, 32 while the inlet to the valve body 30 is connected to a pump and reservoir designated 33, 34. The followup system 35 includes an actuating rod and piston 36 to be connected to one end of the vehicle V with the cylinder 37 thereof connected to the opposite end thereof. The flow lines 38, 39 from this followup cylinder 37 are connected to the followup input end 40 of the geared spool engaging end portion 28. This input end 40 is connected to the spool engaging end 28 through a set of elliptical gears 41 such that this input will not be constant but will vary as the same are rotated.

The primary development provided by applicant lies in the differentially geared steering wheel input-followup input system and this system is particularly illustrated in FIGS. 3 through 7. In the form shown in these figures, the control device includes the valve member 28, the spool engaging portion, valve spool 29, valve body 30, steering wheel input end 27 and the followup input 40.

The valving member 26 and the differentially geared spool engaging portion 28 are, in the form shown, arranged in a common housing 45 which provides a generally centrally located spool and flow control passage 46 in which the spool valve 29 is mounted. Arranged in longitudinally spaced relation in this passage 46 are a plurality of flow control grooves beginning with the central inlet groove 47 communicating with a fluid inlet passage 48, which passage communicates with the pump 33 for the delivery of actuating fluid to the valve.

Spaced on either side of the central inlet groove 47 are a pair of outlet grooves 49, 50 which communicate respectively with the actuating cylinders 31, 32 each of the grooves and the fluid controlled thereby communicates with each of the actuating cylinders for the extension of one and the retraction of the other. During fluid delivery from one of these grooves 49, 50, fluid will be received by the other such groove. A pair of return grooves, 51, 52 are arranged respectively on the ends of the passage 46 to receive fluid from actuating cylinders 31 and 32 and these grooves commonly discharge through a port 53 into the reservoir 34.

Figure 5:
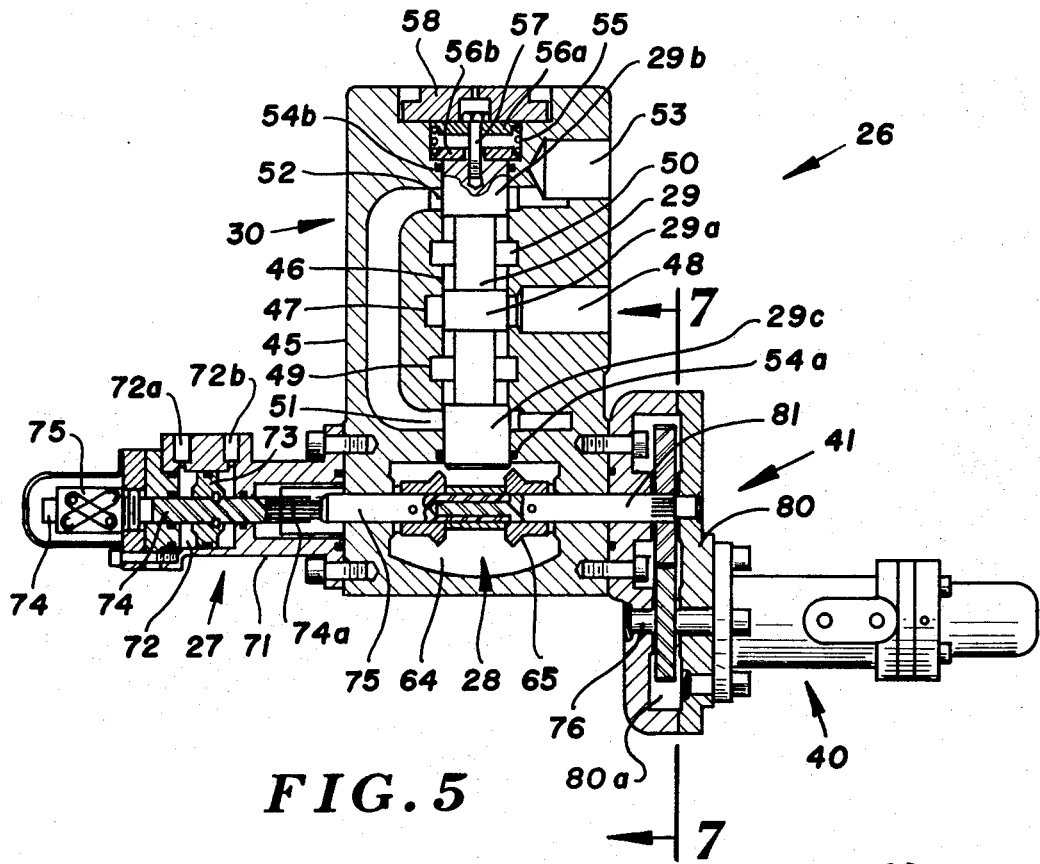
FIG. 5 is a vertical section taken substantially along Line 5—5 of FIG. 4.

The spool valve illustrated in FIGS. 2 and 5 is of the type known as a closed center-blocked cylinder port system and in this type of system, the valve spool 29 has three groove sealing lands thereon. These consist of a central land 29a, and a pair of end lands 29b, 29c. The central such land 29a covers the inlet groove 47 when the same is in neutral position and the end lands 29b, 29c are likewise in sealing position over the return grooves 51, 52. When the spool valve 29 is shifted one way or the other it should be obvious that the inlet fluid will be delivered to either of the outlet grooves 49 or 50 and the other outlet groove will communicate with the return groove 51 or 52.

The industry is aware of various systems for such power steering control and these systems include both open center systems with both blocked and open cylinder ports communicating with the actuating cylinders and closed center systems with both blocked and open cylinder ports communicating with the actuating cylinders. These systems are selected for the particular application and applicant's device and concepts are equally applicable regardless of the selected valving system.

As illustrated, the spool valve 29 is sealed within the passage 46 with O-rings 54a, 54b or the like at the respective ends thereof and the neutral position of the spool valve 29 is maintained by providing a biasing member 55 between a pair of collar members 56a, 56b with a connecting member 57 holding the same in proper position with respect to the spool 29 and the closure plate 58 located at the end of the valve body 30.

The means for actuating and positioning the spool valve 29 is illustrated in FIGS. 2, 3, 5 and 6. In the form shown the spool 29 is provided with an attachment head 60 having an aperture therethrough, designated 60a, designed to receive a connecting end 61 of a rockable acutator 62. The design for these elements is such that the actuator will oscillate about an axis below the spool 29 thereby pushing and pulling the spool into and out of the passage 46 thereby controlling the flow of fluid through the flow passages of the valve.

A differential gear set, previously designated 28 is provided and includes a first gear 63 secured to the actuator 62, a second gear 64 termed a steering wheel input gear and a third gear termed a followup input gear and designated 65. A principle of differential gearing is that rotation of one of the input gears, while holding the other input gear stationary will cause the third gear, in this case, the gear attached to the actuator, to move inwardly or outwardly. When applied to this particular situation, it should be obvious that moving the steering wheel one direction or the other will cause either inward or outward movement of the spool and ultimately cause movement of the steered wheels through the actuating cylinders. This movement of the steered wheels will produce movement of the followup device and this movement will ultimately cause rotation of the third gear in a direction to cause the spool 29 to be returned to its neutral position.

The method of achieving rotation of the input gears 64 and 65 will be explained with reference only to the gear 64 for except for the elliptical gearing section 41, the two input sections are identical.

Steering wheel input section 27 includes a housing 71 having a hydraulic chamber 72 defined therein with connective ports 72a, 72b to recieve the lines 24, 25. A piston 73 is arranged for longitudinal movement within chamber 72 upon the entrance of fluid and the piston 73 is fixedly mounted on a shaft 74 to be carried therewith. Obviously the shaft must be sealed to the housing to maintain the fluid within the chamber 72. A first end of the shaft 74 is threaded and a device, known to the industry as a ballnut, 75 is held in a stationary position such that as the shaft is moved longitudinally therethrough, a rotary motion is imparted thereto. This structure then converts the linear motion of the piston 73 to rotary motion for the shaft 74.

Figure 7:
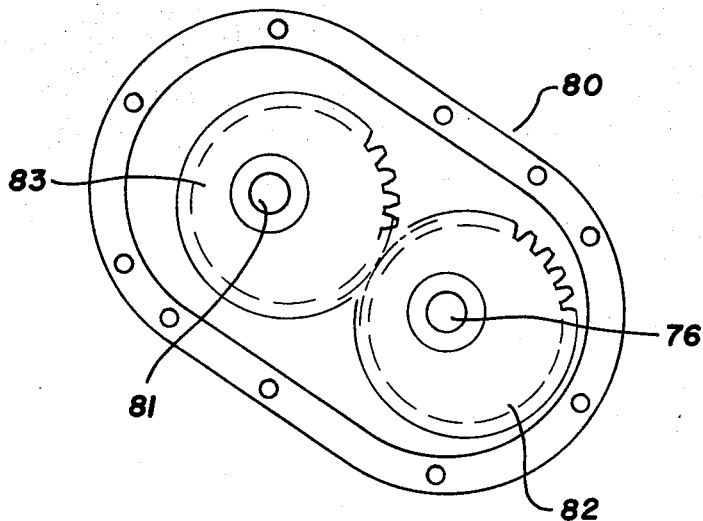
FIG. 7 is a section taken substantially along Line 7—7 of FIG. 5.
Figure 6:
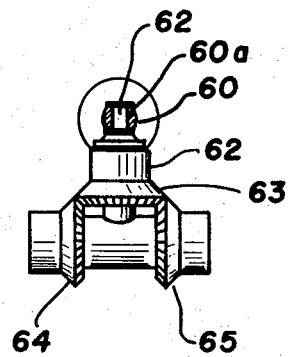
FIG. 6 is a section taken substantially along Line 6—6 of FIG. 3.

The opposite end of the shaft 74 is splined as at 74a and a splined connector section 75 is provided to connect the shaft 74 to the gear 64. This splining or similar type connection is necessary to provide positive connection between the shaft 74 and gear 64 for the shaft is not only rotating but is also moving longitudinally. This same type of structure is used for the input to gear 65 of the followup device 40 to deliver rotary motion to the shaft 76 of the elliptical gearing section 41. In this section 41 a housing 80 having a gear containing and mounting chamber 80a is provided and as illustrated, this housing is provided to transmit rotary power to the input gear 65 through connection to shaft 81. Shafts 76 and 81 are connected to elliptical gears as illustrated in FIG. 7 which gears are designated 82, 83. It should be noted that for a complete rotation, lock-tolock, of the steering wheel these gears will only rotate through 360°.

The gears 82, 83 are selected to have the degree of eccentricity such that the desired ratio of steering is provided over the full steering cycle. That is to say that steering ratio will provide the desired over the road qualities as well as the high maneuverable requirements for close handling.

It should be obvious that this same type of gearing relationship should be obtainable through modifications of the illustrated device. For example, it could be possible to replace the hydraulic followup device with mechanical linkage while still employing a variable driving translation device to provide a modified input to gear 65. In applicant's device there is a possibility that there could be a minimal phase shifting between the steered wheels and the followup input. This would be eliminated with a mechanical connection.

The concept of applicant's invention provides a unique comcept in steering control for vehicles which must be utilized in relatively varied applications wherein the ratio of the steering system is a demanding factor. The variability of the followup mechanism provides a unit which accomplishes this ratio change and will allow the operation of the vehicles to be optimized during the various operative situations by optimizing the ratio of the system over the full steering cycle.

The situation illustrated provides a varied followup but it should be obvious that this same type of situation could be obtained with a varied input. This would merely entail a shifting of the eccentric output of the followup to the steering wheel input side. This should be well within the scope of the disclosed invention.

What I claim is:

1. A variable ratio steering control for vehicles, including:
   a. at least one actuating cylinder for shifting the steerable portions of the vehicle;
   b. valving means having a movable control portion for receiving fluid under pressure and directing the same to said actuating cylinder;
   c. vehicle position sensing means arranged and constructed for actuation by the shifting of the steerable portions of the vehicle and connected to said movable control portion of said valve to return the same to a position of no fluid flow;
   d. differential gearing means including an output, a second and a third gear;
   e. hand controllable means arranged and constructed to impart rotary motion to a second of the differential gears;
   f. said movable portion connected to said output gear;
   g. said vehicle position sensing means arranged and constructed to impart rotary motion to said third differential gear whereby rotation of one of said second or third gears while holding the other such gear stationary results in oscillation of said output gear;
   h. said hand controllable means and said vehicle position sensing means acting on said gears in variable ratios over the full steering cycle;
   i. said vehicle position sensing means including hydraulic cylinder means connected to relatively movable portions of the vehicle for pumping of fluid upon movement thereof; and,
   j. means for converting fluid flow from said vehicle position sensing cylinder including;
      1. a hydraulic cylinder and piston;
      2. a shaft movable with said piston;
      3. a portion of said shaft being threaded; and,
      4. a stationary threaded portion receiving said threaded shaft portion whereby longitudinal movement of said shaft through said stationary threaded portion will impart rotary motion to said shaft.

2. The structure set forth in claim 1 and a set of gears receiving the output from said shaft, connected to said third differential gear for rotation thereof.

3. The structure set forth in claim 2 and said gears including a pair of elliptical gear members having an elliptical relation over the full steering cycle.

4. The structure set forth in claim 1 and said hand controllable means including:
   a. hand operated pump means generating hydraulic fluid flow; and,
   b. means for converting the generated fluid flow to impart rotary motion to said second differential gear.

5. The structure set forth in claim 4 and said flow converting means including:
   a. a hydraulic cylinder and piston;
   b. a shaft movable with said piston;
   c. a portion of said shaft being threaded; and,
   d. a stationary threaded portion receiving said threaded shaft portion whereby longitudinal movement of said shaft through said stationary threaded portion will impart rotary motion to said shaft.

* * * * *